United States Patent [19]

Przytulski et al.

[11] Patent Number: 5,131,814
[45] Date of Patent: * Jul. 21, 1992

[54] TURBINE BLADE INNER END ATTACHMENT STRUCTURE

[75] Inventors: James C. Przytulski, Fairfield; Richard L. Horvath, Hamilton; Philip H. Stoughton, Cincinnati; Christopher C. Glynn, Hamilton; Richard A. Wesling; Robert J. Corsmeier, both of Cincinnati, all of Ohio

[73] Assignee: General Electric Company, Cincinnati, Ohio

[*] Notice: The portion of the term of this patent subsequent to Jul. 21, 2009 has been disclaimed.

[21] Appl. No.: 505,121

[22] Filed: Apr. 3, 1990

[51] Int. Cl.$^5$ .................... F01D 5/30; F01D 5/32
[52] U.S. Cl. ........................ 416/217; 416/218; 416/220 R; 416/193 A
[58] Field of Search ........... 416/129, 193 A, 198 A, 416/204 A, 215, 217, 218, 219 R, 220 R; 415/189, 190, 191, 209.2, 209.3

[56] References Cited

U.S. PATENT DOCUMENTS

| 747,523 | 12/1903 | Wilkinson | 416/217 |
|---|---|---|---|
| 3,165,294 | 1/1965 | Anderson . | |
| 3,326,523 | 6/1967 | Bobo . | |
| 3,365,173 | 1/1968 | Lynch et al. | 415/209.2 |
| 3,423,071 | 1/1969 | Noren | 415/209.2 |
| 3,501,249 | 3/1970 | Scalzo et al. | 416/193 A |
| 3,807,891 | 4/1974 | McDow et al. . | |
| 4,304,523 | 12/1981 | Corsmeier et al. . | |
| 4,389,161 | 6/1983 | Brumen . | |
| 4,687,413 | 8/1987 | Prario | 415/190 |
| 4,826,403 | 5/1989 | Catlow | 416/129 |
| 4,856,963 | 8/1989 | Klapproth et al. | 415/189 |
| 4,907,944 | 3/1990 | Kroger et al. . | |
| 5,007,800 | 4/1991 | Hacault et al. | 416/220 R |
| 5,018,941 | 5/1991 | Heurtel et al. | 416/220 R |

FOREIGN PATENT DOCUMENTS 2128686  5/1984  United Kingdom .

Primary Examiner—Edward K. Look
Assistant Examiner—James A. Lorson
Attorney, Agent, or Firm—Jerome C. Squillaro; Nathan D. Herkamp

[57] ABSTRACT

A gas turbine engine having an outer annular turbine rotor, which is counterrotatable relative to an inner annular turbine rotor, includes attachment structure for attaching turbine blades in circumferential rows to the inner rotor. The attachment structure includes first and second male members of hook-like configurations spaced axially along and circumferentially extending about the rotor, and first and second grooves defined by flanges attached to the rotor and axially spaced along and circumferentially extending about the rotor. The grooves open in a common axial direction for receiving in mated relation respectively and concurrently the hook-like configured first and second male members. The attachment structure also includes several different locking arrangements for locking the male members in mated relation with the grooves to thereby restrain the turbine blade against radial and axial movements relative to the rotor. Some locking arrangements are adapted for locking all of the blades but a last or final one thereof in a circumferential row around the rotor. Other locking arrangements are adapted for locking all of the blades in the circumferential row. Still other locking arrangements are adapted for locking only the last or final blade to complete the circumferential row of blades.

28 Claims, 11 Drawing Sheets

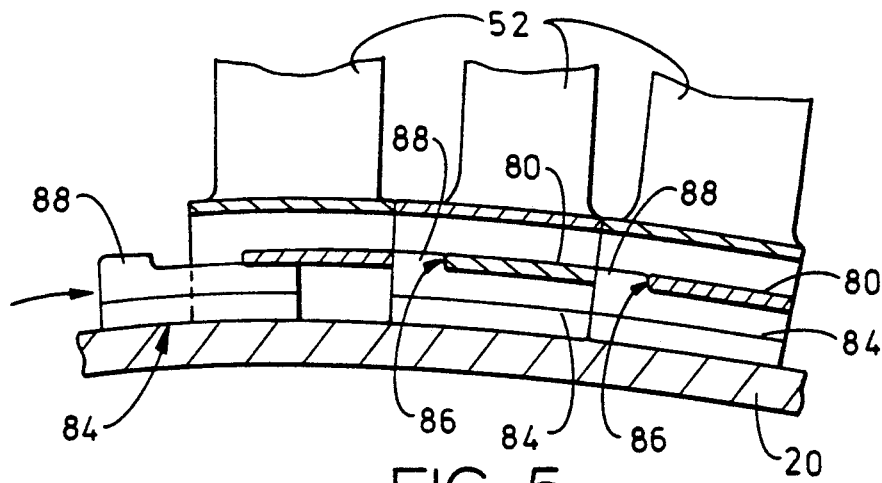
FIG. 5
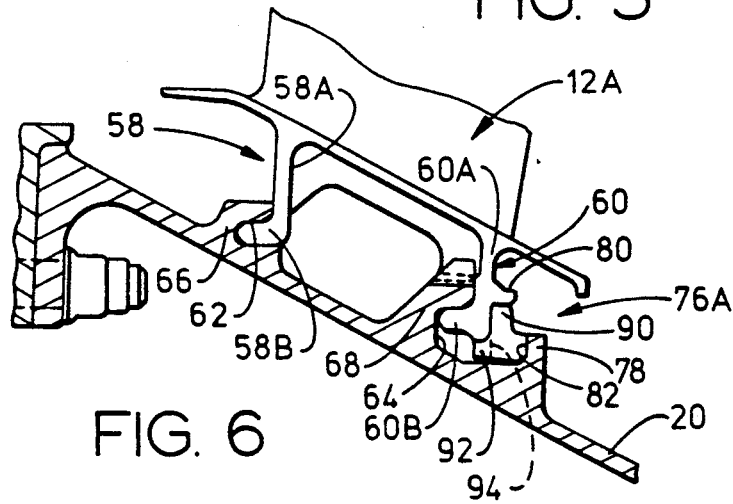
FIG. 6
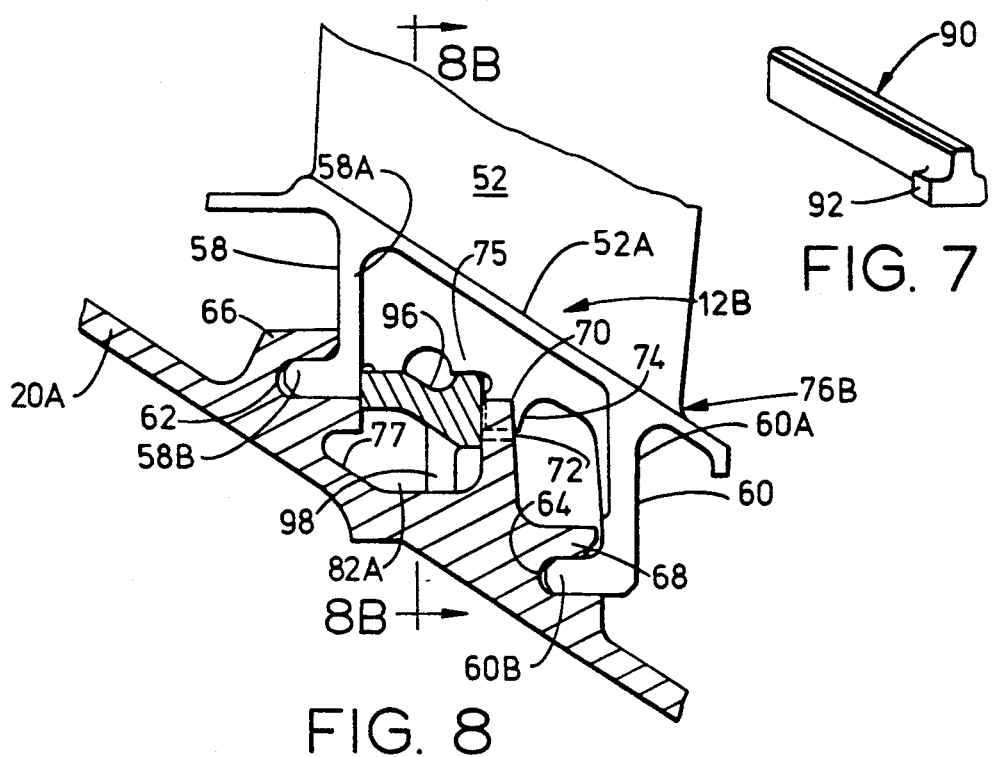
FIG. 7
FIG. 8

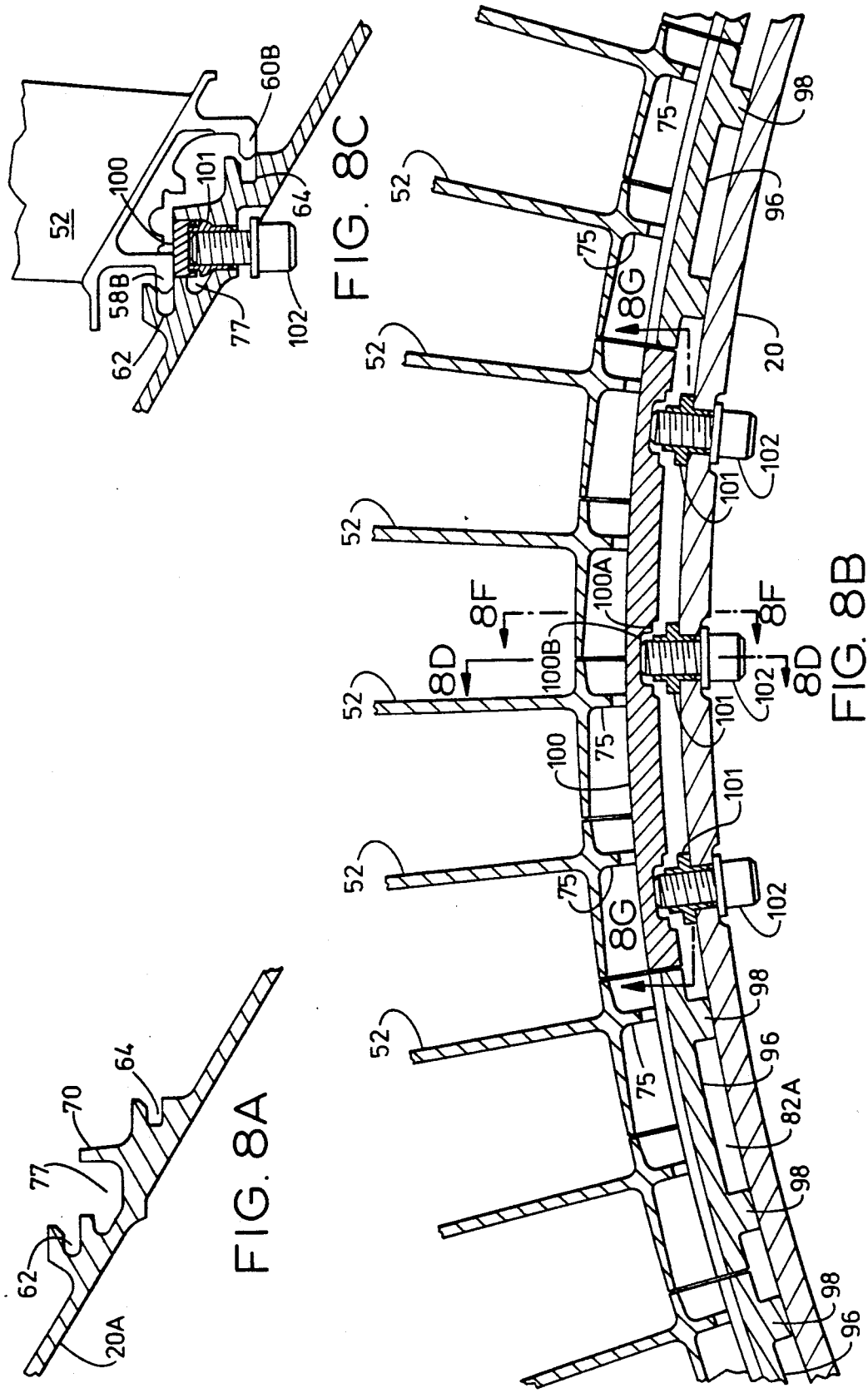

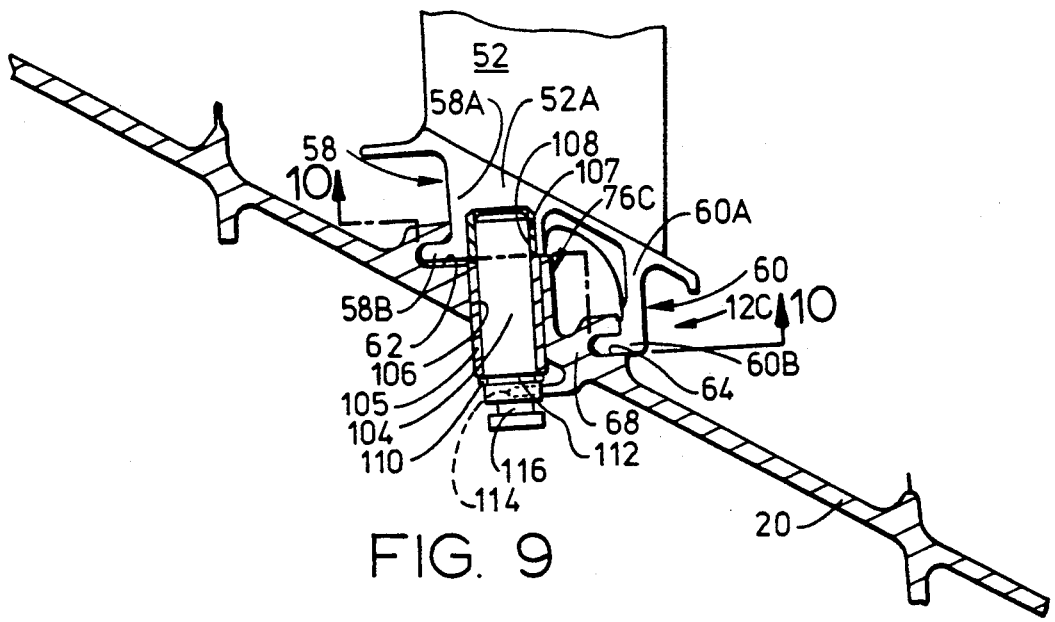
FIG. 9
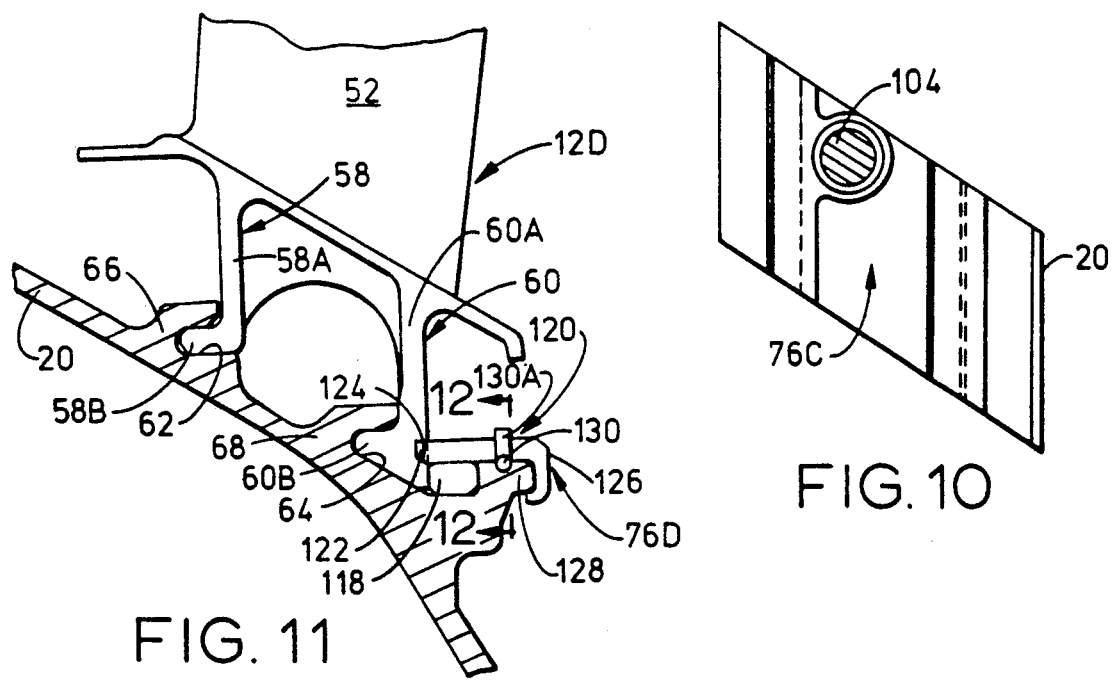
FIG. 11
FIG. 10
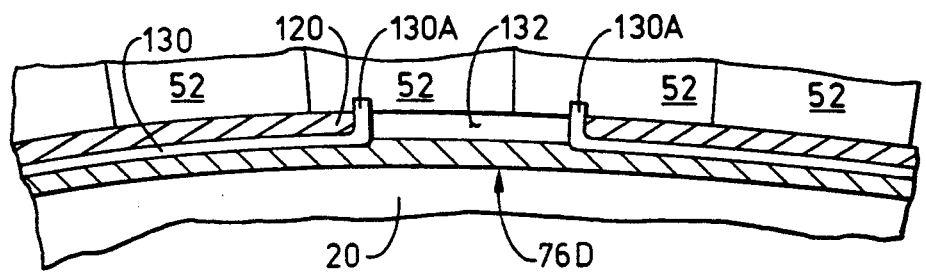
FIG. 12

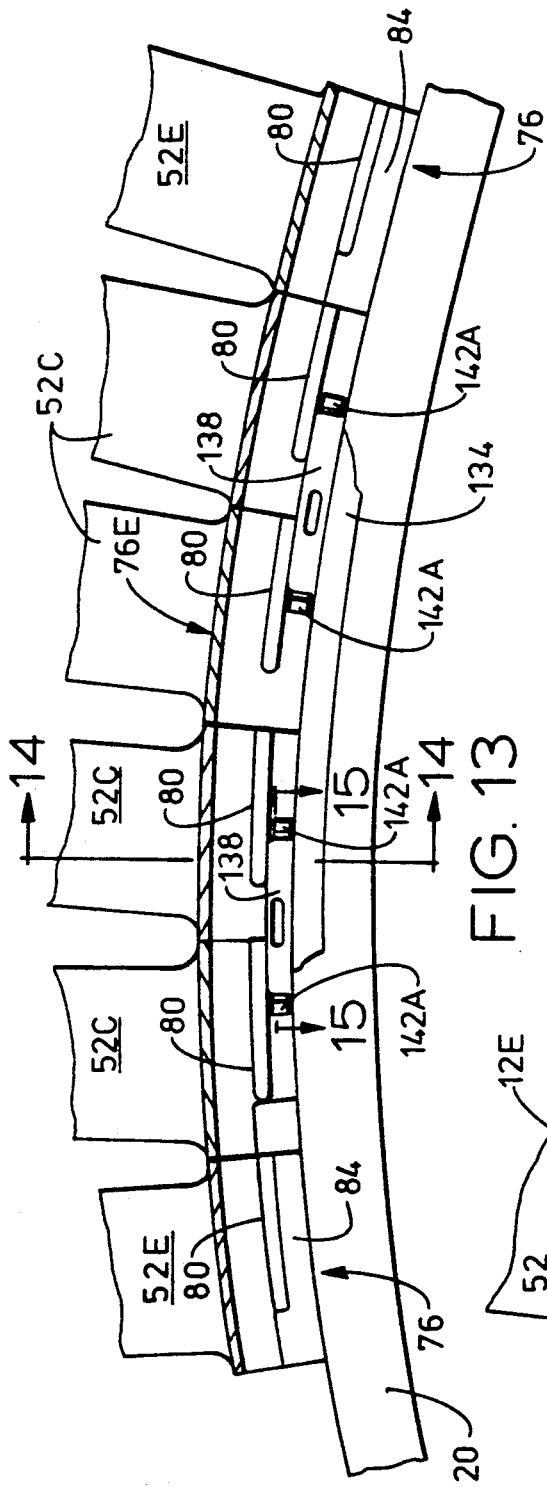
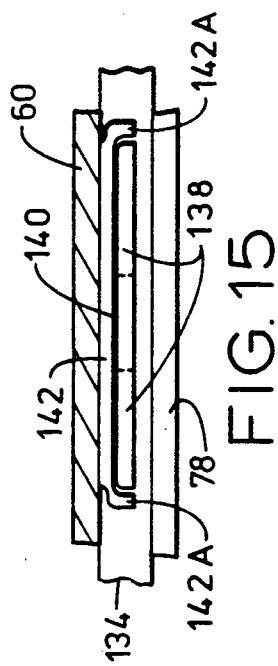
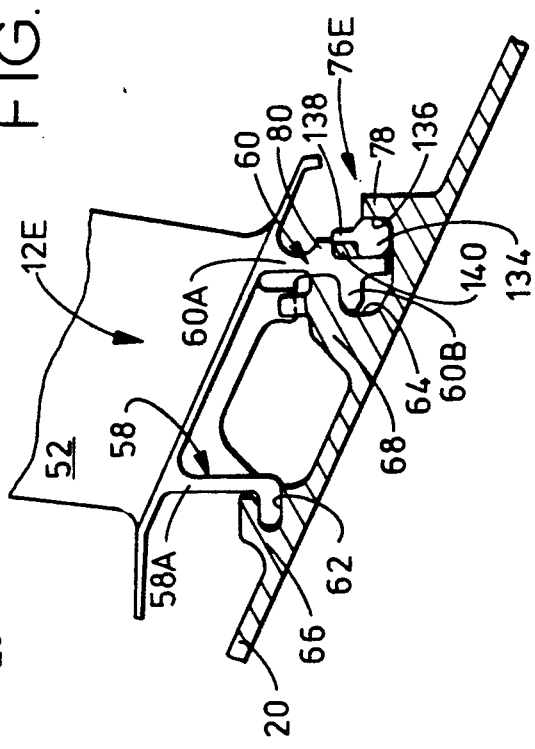
FIG. 13
FIG. 15
FIG. 14

TURBINE BLADE INNER END ATTACHMENT STRUCTURE

CROSS-REFERENCE TO RELATED APPLICATIONS

Reference is hereby made to the following copending U.S. patent applications dealing with related subject matter and assigned to the assignee of the present invention:

1. "Counter Rotation Power Turbine" by Kenneth O. Johnson, assigned U.S. Ser. No. 071,594, filed Jul. 10, 1987, a continuation of application Ser. No. 728,466 and filed May 1, 1985, now abandoned, which was a continuation-in-part of application Ser. No. 437,923, filed Nov. 1, 1982, now abandoned.

2. "Interstage Seal Arrangement For Airfoil Stages of Turbine Engine Counterrotating Rotors" by Przytulski et al., assigned U.S. Ser. No. 07/505,120 and filed concurrently herewith.

3. "Turbine Blade Outer End Attachment Structure" by Przytulski et al., assigned U.S. Ser. No. 07/505,118 and filed concurrently herewith.

BACKGROUND OF THE INVENTION

1. Field of the Invention

The present invention relates generally to gas turbine engines and, more particularly, is concerned with an attachment structure useful for attaching turbine blades at their inner ends to a rotor of a gas turbine engine.

2. Description of the Prior Art

Gas turbine engines generally include a gas generator which comprises a compressor for compressing air flowing aft through the engine, a combustor in which fuel is mixed with the compressed air and ignited to form a high energy gas stream, and a turbine driven by the gas stream which is connected by a shaft to, in turn, drive the compressor. Many engines further include a second turbine, known as a power turbine, located aft of the gas generator and which extracts energy from the gas flow to drive a rotating load with variable pitch blades such as found in the propulsor of helicopters and turboprop engines and fixed pitch blades in ducted turbofan engines.

A recent improvement over the turbofan and turboprop engines is an unducted fan engine such as disclosed in the first U.S. patent application cross-referenced above. In the unducted fan engine, the power turbine includes counterrotating rotors with turbine blades defining counterrotating airfoil stages which drive in corresponding fashion unducted fan blades located radially outwardly with respect to the power turbine. The fan blades of the unducted fan engine are variable pitch blades to achieve optimum performance by varying the pitch of the blades in response to specific operating conditions.

In prior art turbine engines, dovetail structures have been widely accepted as efficient means of attaching turbine blades to structural components, such as a turbine rotor. However, in view of the relatively low rotational speeds of the counterrotating rotors in the power turbine of the unducted fan engine, more flexibility is allowed in the design of turbine blade attachment structures to meet restrictive weight requirements.

Consequently, a need exists for alternative approaches which take advantage of this added flexibility to provide lightweight structures for attaching turbine blades on counterrotating rotors in the unducted fan engine as well as in other flight or stationary turbomachinery applications.

SUMMARY OF THE INVENTION

The present invention provides a turbine blade end attachment structure designed to satisfy the aforementioned needs. The attachment structure of the present invention is particularly applicable to attaching the inner end of a turbine blade to the inner rotor spool of the counterrotating rotors in the unducted fan engine where there is a requirement to restrain airfoil pretwist imposed by the blade tip shroud. The attachment structure constituting the invention of the third patent application cross-referenced is particularly applicable to attaching the outer end of a turbine blade to the outer rotor spool of the counterrotating rotors in the unducted fan engine. The concepts underlying the attachment structures of both the present invention and that of the third cross-referenced application can be employed with either individual airfoils (or blades) or with multi-airfoil segment components in low speed and stationary turbomachinery applications.

Accordingly, the present invention is directed to an attachment structure for attaching turbine blades in one or more circumferential rows to a rotor of a gas turbine engine. The attachment structure comprises: (a) first and second male members spaced axially along and extending circumferentially about the rotor, each male member having a first portion attached to an end of a turbine blade and extending therefrom in a radial direction and a second portion attached to the first portion and extending therefrom in an axial direction such that the first and second portions define each male member with a hook-like configuration; (b) means attached to the rotor defining first and second grooves spaced axially along and extending circumferentially about the rotor and opening in a common axial direction for receiving in mated relation respectively and concurrently the second portions of the hook-like configured first and second male members; and (c) means for locking the second portions of the male members in mated relation with the grooves to thereby restrain the turbine blade against radial, axial and circumferential movements relative to the rotor.

Several different embodiments of the locking means are provided. Some of the locking arrangements are adapted for locking all of the blades in a circumferential row around the rotor in the same manner with a common lock and lock retainer. Other locking arrangements are adapted for locking all of the blades in the same manner but use a different lock and lock retainer for the last or final blade or blades to complete the circumferential row of blades.

These and other features and advantages and attainments of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which:

FIG. 5 is an elevational view, partly in section, of the attachment structure as seen along line 5—5 of FIG. 4.

FIG. 6 is a view similar to that of FIG. 4, but showing another form of the attachment structure being useful for attaching all but the final blade in a circumferential row.

FIG. 7 is a perspective view of a blade lock member of the attachment structure of FIG. 6.

FIG. 8 is a view similar to that of FIG. 4, but showing still another form of the attachment structure being useful for attaching all but the last four blades in a circumferential row.

FIG. 8A-8I are partial cross-sectional views of the embodiment of FIG. 8.

FIG. 9 is a view similar to that of FIG. 4, but showing a further form of the attachment structure being useful for attaching all of the blades in a circumferential row.

FIG. 10 is a fragmentary bottom plan view of the attachment structure as seen along line 10—10 of FIG. 9.

FIG. 11 is a view similar to that of FIG. 4, but showing a still further form of the attachment structure being useful for attaching all of the blades in a circumferential row.

FIG. 12 is an elevational view, partly in section, of the attachment structure as seen along line 12—12 of FIG. 11.

FIG. 13 is an elevational view, with portions broken away, of another preferred form of the attachment structure being useful for attaching all of the blades in multi-blade segments thereof in a circumferential row.

FIG. 14 is a sectional view taken along line 14—14 of FIG. 13.

FIG. 15 is a sectional view taken along line 15—15 of FIG. 13.

DETAILED DESCRIPTION OF THE INVENTION

Figure 1:
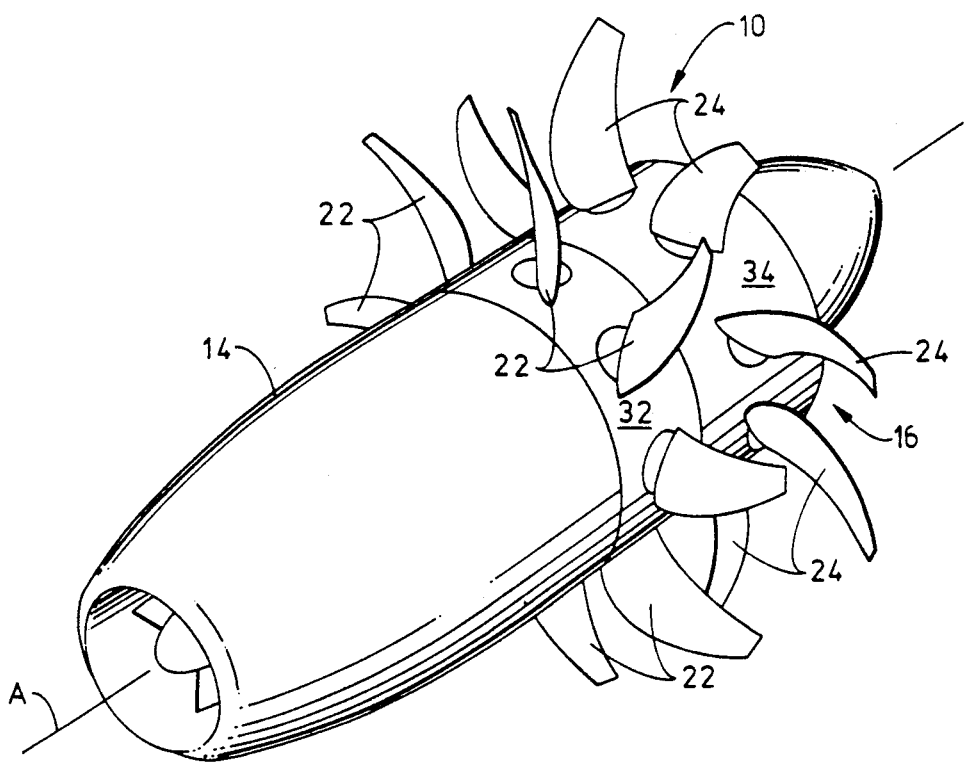
FIG. 1 is a perspective view of an unducted fan-type gas turbine engine in which the turbine blade end attachment structure of the present invention can be employed.

In the following description, like reference characters designate like or corresponding parts throughout the several views. Also, in the following description, it is to be understood that such terms as "forward," "rearward," "left," "right," "upwardly," "downwardly," and the like, are words of convenience and are not to be construed as limiting terms.

In General

Figure 2:
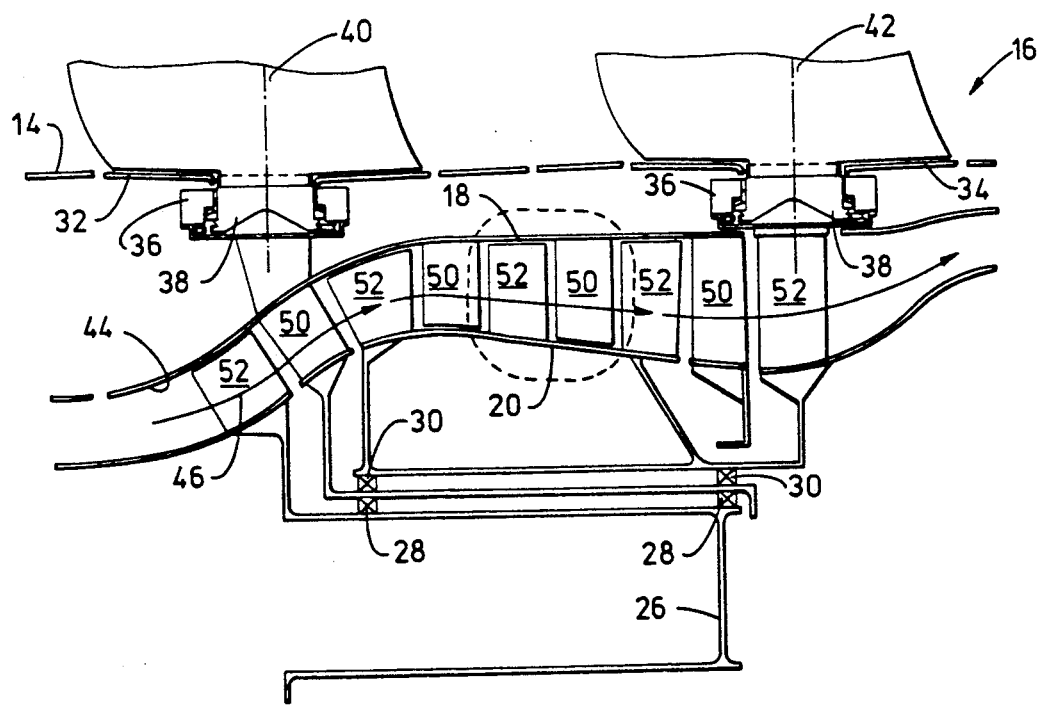
FIG. 2 is a schematic axial sectional view of a turbine section of the unducted fan engine of FIG. 1.
Figure 3:
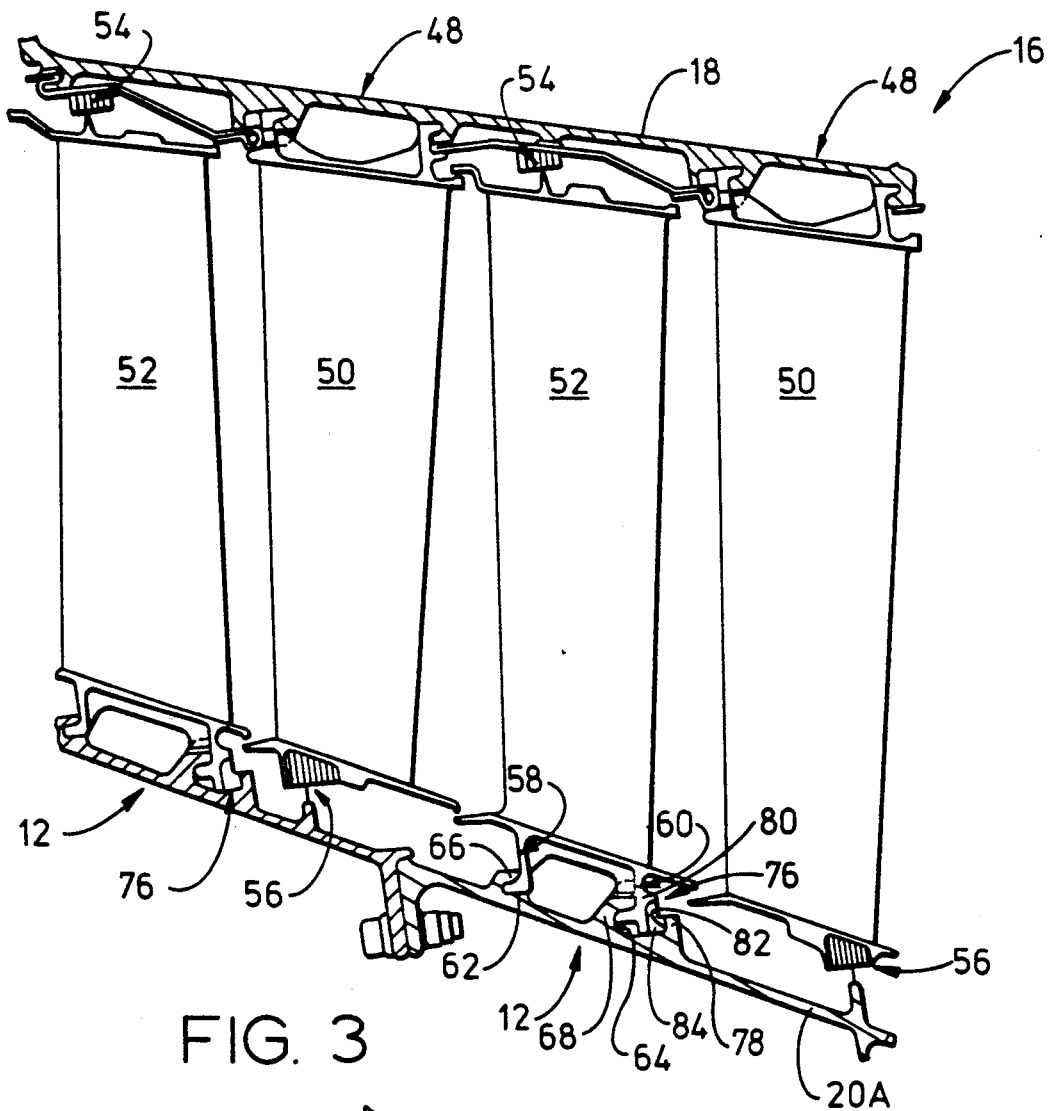
FIG. 3 is an enlarged fragmentary detailed view of the portion of turbine section encircled in FIG. 2.

Referring now to the drawings, and particularly, to FIG. 1, there is shown a gas turbine engine 10 of the unducted fan type which incorporates the preferred embodiment of the turbine blade end attachment structure of the present invention, generally designated 12 in FIG. 3. The engine 10 has an outer shroud or nacelle 14 which encompasses a forward gas generator (not shown) and an aft power turbine 16, illustrated schematically in FIG. 2. In a known manner, the gas generator produces combustion gases which are channeled to the power turbine 16.

As seen in FIG. 2, the power turbine 16 includes first (or outer) and second (or inner) annular turbine rotors 18, 20 which are adapted to rotate in opposite directions, or counterrotate, about a longitudinal centerline axis A of the engine 10. The rotors 18, 20 respectively mount for rotation therewith tandemly-arranged forward and rearward sets of propulsor blades 22, 24. The first, outer rotor 18 is rotatably mounted about a hollow static structure 26 of the engine 10 by a first set of bearings 28, whereas the second, inner rotor 20 is rotatably mounted about the first rotor 18 by a second set of bearings 30.

The nacelle 14 encompasses the rotors 18, 20 with the sets of propulsor blades 22, 24 extending circumferentially and radially outward from the exterior of the nacelle 14. The nacelle 14 includes a first, or forward, sleeve 32 which is coupled to and rotatable with the forward set of propulsor blades 22, and a second, or rearward, sleeve 34 which is coupled to and rotatable with the rearward set of propulsor blades 24. The exterior configuration of the nacelle 14 provides proper airflow characteristics to optimize the performance of the propulsor blades 22, 24 and thereby of the engine 10.

To further optimize the performance of the engine 10, the pitch of the propulsor blades 22, 24 can be varied to correspond to specific operating conditions. The blades 22, 24 of the forward and rearward sets thereof are rotatably mounted by hubs 36 to the interior sides of the forward and rearward nacelle sleeves 32, 34 and coupled to pitch varying mechanisms 38 operable for rotating the blades 22, 24 about respective pitch change axes 40, 42. Attention is directed to U.S. Pat. No. 4,738,590, which issued to Butler and is assigned to the assignee of the present invention, for gaining a detailed understanding of the blade pitch varying mechanisms.

The aft power turbine 16 also has an annular gas flowpath 44 for receiving combustion gases from the forward gas generator of the engine 10. The gas flowpath extends between the outer and inner rotors 18, 20 of the power turbine 16 and combustion gases flow therethrough as a high energy gas stream 46. As shown in FIG. 3, the outer and inner rotors 18, 20 of the power turbine 16 respectively mount, via turbine blade outer and inner end attachment structures 48, 12, axially spaced rows of circumferentially and radially extending turbine blades 50, 52 which alternate with one another so as to define counterrotatable airfoil stages extending across the annular gas flowpath 44. Also, outer and inner interstage seal structures 54, 56 are provided for limiting passage of the gas stream 46 between the outer and inner rotors 18, 20 and outer and inner ends of the respective turbine blades 52, 50. The inner interstage seal structure 56 and blade outer end attachment structure 48 shown in FIG. 3 are merely exemplary ones of several different attachment and seal structures which can be employed in the turbine engine 10. These structures are the subject of the second and third patent applications cross-referenced above. They need not be described in detail herein for a complete and thorough understanding of the turbine blade end attachment structure 12 of the present invention.

Thus, the high energy gas stream 46 flowing through the annular gas flowpath 44 between the rotors 18, 20 causes the sets of turbine blades 50, 52 to turn or move in opposite directions about circular paths, in turn, causing the respective rotors 18, 20 to counterrotate and correspondingly counterrotatably drive the sets of propulsor blades 22, 24.

Turbine Blade End Attachment Structures of the Present Invention

In accordance with the principles of the present invention, FIGS. 3–36 illustrate different embodiments of the attachment structure 12 and 12A–12I for attaching turbine blades 52 at their inner ends 52A in circumferential rows to the inner rotor 20. Each embodiment employs some of the basic parts incorporated by one preferred embodiment of the attachment structure 12 illustrated in FIGS. 3–5. In the attachment structure 12 of FIGS. 3–5, these basic parts include forward and aft male members 58, 60 axially spaced along and circumferentially extending about the inner end of each blade 52 and forward and aft grooves 62, 64 defined by forward and aft flanges 66, 68 attached on the exterior side of the inner rotor spool 20A and axially spaced along and circumferentially extending about the rotor. The grooves 62, 64 open in a common axial direction for receiving in mated relation respectively and concurrently the first and second male members 58, 60 of each blade 52.

Figure 4:
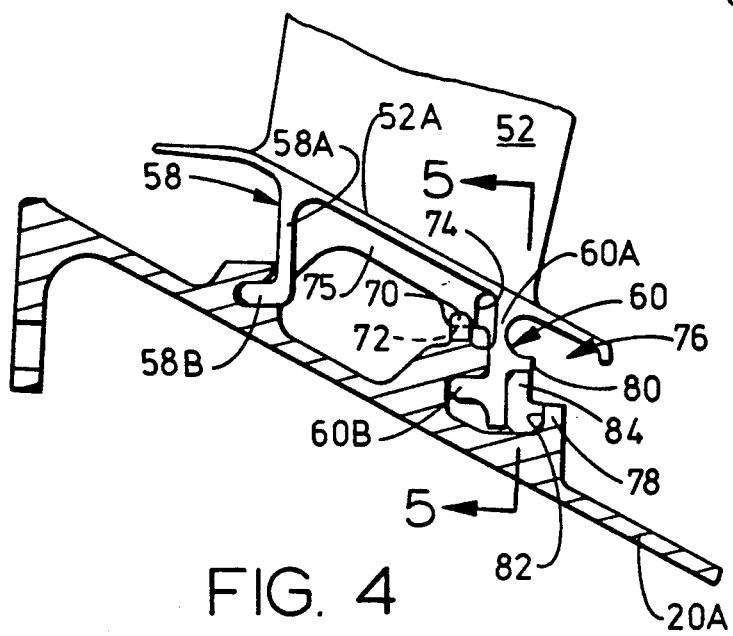
FIG. 4 is an enlarged fragmentary view of the turbine section portion of FIG. 3 illustrating a preferred form of a turbine blade end attachment structure of the present invention being useful for attaching all but a last or final blade in a circumferential row.

The attachment structure 12 of FIGS. 3–5 can be employed with either single blades 52 or multi-blade segments. It is described hereinafter in conjunction with a single blade 52. Further, while the end attachment structure 12 is illustrated and described herein in an application for attaching inner ends of the turbine blades 52 to the exterior side of the inner rotor 20 in the unducted fan-type gas turbine engine 10, it should be understood that possible applications of the attachment structure 12 are not so limited; for example, it could also be used for attaching outer ends of turbine blades in the same or other applications.

More particularly, the forward and aft male members 58, 60 of the attachment structure 12 each have first and second portions 58A, 58B and 60A, 60B defining the male members in a hook-like or inverted-L shaped configuration. The first portion 58A, 60A of each male member 58, 60 is attached to platform 52A of the turbine blade 52 and extends therefrom in an inward radial direction. The second portion 58B, 60B of each male member 58, 60 is integrally attached to its first portion 58A, 60A and extends therefrom in a common axial direction and generally transverse to the first portion 58A, 60A to define the overall hook-like cross-sectional configuration of the male members 58, 60.

The forward and aft grooves 62, 64 of the attachment structure 12, which are defined by the forward and aft flanges 66, 68 to open in the same or common axial direction, are cross-sectionally shaped for receiving in mated relation respectively and concurrently the second portions 58B, 60B of the forward and aft male members 58, 60. For installing the blade 52 on the inner rotor 20, the blade 52 is first moved radially toward the rotor to align the second portions 58B, 60B with the respective grooves 62, 64 and then the blade 52 is moved axially toward the grooves to insert the male member second portions in mated relation therein. Once the second portions 58B, 60B of the male members 58, 60 are inserted in mating relations in the forward and aft grooves 62, 64, then the blade 52 can be restrained in place by a locking arrangement which will be described below, to lock the turbine blade 52 against both radial and axial movements relative to the inner rotor 20.

Also, as seen in FIG. 4, the preferred embodiment of the attachment structure 12 (and the embodiments of attachment structures 12E-12I in FIGS. 13-32), includes a circumferentially extending flange 70 attached to and projecting radially outward from the aft flange 68 of the inner rotor spool 20A. Slots 72 in flange 70 are provided in a circumferential row to mate with elements in the form of a row of tabs 74 which are integral with gussets 75 attached to, projecting radially inward from, and extending in circumferentially spaced relation along the platform 52A of the turbine blade 52. The inner rotor slots 72 and the blade tabs 74 are disposed in an interfitting relation so as to restrain movement of the turbine blade 52 in circumferential or tangential relation to the inner rotor spool 20A.

However, in the various embodiments of the blade inner end attachment structure 12 and 12A-12I in FIGS. 3-37, alternative locking arrangements 76 and 76A-76I are provided for locking the male members 58, 60 in mated relation with the grooves 62, 64 to thereby restrain the turbine blade 52 against radial and axial movements relative to the inner rotor 20. Particularly, in the two alternative embodiments of FIGS. 3-5 and 6-7, the respective locking arrangements 76 and 76A of the attachment structures 12 and 12A are adapted for locking all of the blades 52 but the last or final one in the circumferential row around the inner rotor spool 20A.

In the preferred embodiment illustrated in FIGS. 3-5, the locking arrangement 76 of the attachment structure 12 includes a first and second projection or flanges 78, 80. The first flange 78 is attached to the rotor spaced axially from the aft male member 60 and aft groove 64 and extends circumferentially about and radially outward from the inner rotor spool 20A. The second flange 80 is attached to a heel side of the first portion 60A of the aft male member 60 at a location thereon spaced outwardly of and on an opposite side from the second portion 60B of the aft male member 60. The first and second flanges 78, 80 together with the aft male member 60 and the inner rotor 20 define a locking cavity 82 which opens outwardly between the first and second flanges 78, 80. Also, the locking arrangement 76 includes an elongated lock member 84 of a cross-sectional shape sized to fit within the lock cavity 82 and in locking engagement with the first and second flanges 78, 80, the aft male member 60 and the inner rotor spool 20A to thereby restrain the turbine blade 52 against radial and axial movements relative to the inner rotor 20.

The lock member 84 is curved or arcuate shaped to closely conform to the curvature of the inner rotor spool 20A. The locking cavity 82 is open at its opposite ends and thereby adapted to slidably receive the lock member 84 therein through one of the open cavity ends. The lock member 84 can be sized in length to simultaneously lock one or more blades and is inserted into the locking cavity 82 from the adjacent position of the blade or blade group that has not yet been installed. The attachment of the blades is completed by circumferentially progressing around the rotor spool 20A and thus in sequence installing the blades and lock members until only space for the last or final blade to be installed remains. If feasible, the lock member 84 is preferably made of wear resistance material.

The second flange 80 on the heel side of the aft male member 60 only extends partially across the member 60 terminating short of its one lateral edge so as to define a lock slot 86 coextensive with a remainder of the heel side of the member 60. The lock member 84 has a tab 88 projecting radially from one end portion of the lock member 84 slightly shorter in length than the lock slot 86 and of a cross-sectional shape sized to fit within the lock slot 86 and thereby in meshing engagement with the second flange 80 when the lock member 84 is fully installed in the lock cavity 82.

In FIG. 6, the alternative locking arrangement 76A of the attachment structure 12A is similar to that of FIG. 4. However, the arrangement 76A does not have the lock slot 86 and the lock member tab 88. Instead, it has a lock member 90, shown in FIG. 7, and aft male member 60 with stop elements 92, 94 defined thereon which interengage when the lock member 90 is fully installed in the locking cavity 82.

In the alternative embodiment of FIG. 8, all blades in the row are identical. The locking arrangement 76B of the attachment structure 12B is located just aft of the forward male member 58 instead of the aft male member 60. The installation of the blades 52 is slightly different from FIG. 4. The blades are merely slid axially forward until the male members 58B and 60B are engaged in the forward and aft grooves 62 and 64 in the inner rotor spool 20A. The gusset 75 on blade platform 52A, the heel on the aft side of the second portion 58B, the cavity 77 formed in the inner turbine rotor spool 20A and the forward side of flange 70 define an enclosed locking cavity 82A. A typical section through inner rotor spool 20A is shown in FIG. 8A. After two blades are slid axially into place with the tabs 74 on the gussets 75 engaged with the slots 72 in the flange 70, a lock member 96 is slid circumferentially into the locking cavity 82A thereby securing the two blades 52 to the inner rotor spool 20A. The lock member 96 is contoured to offer locking contact with the blade platform and rotor spool with the lightest weight. Integral with the lock member 96 are two tabs 98 which position the lock member in an outward direction. FIG. 8B shows a side view of the lock members 96. An alternate number of blades per lock member could also be used.

Since it would be impossible to circumferentially install a lock member 96 after the last blade in the row was installed, a unique final lock member 100, as shown in FIGS. 8B-8G, is used to secure the last four blades installed in the blade row. Prior to installing the last four blades 52, three special self-wrenching, self-locking nuts 101, along with three bolts 102, are partially assembled into the inner rotor spool 20A. With the three nuts 101 fully seated in their respective holes and the bolts 102 not protruding through the nuts, the final lock member 100 is installed into the cavity 77 over the nuts 101 and bolts 102 making sure that it is pushed inward far enough to allow passage of the forward male members second portion 58B into its mating groove 62. After the last four blades are fully seated axially, the three bolts 102 are tightened thereby driving the final lock member 100 radially outward behind the heel of the forward male members second portion 58B.

The flange 70 axially retains the lock members 96 and 100 which in turn retain the blades 52 from moving aft.

Figure 8D:
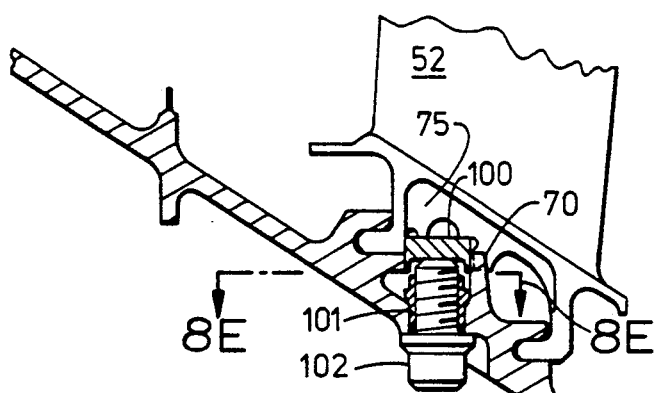
Figure 8E:
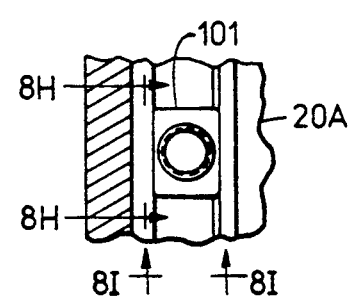
Figure 8G:
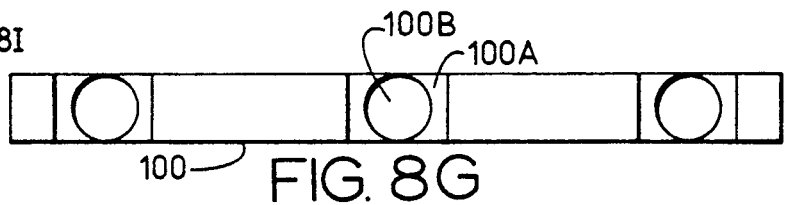
Figure 8F:
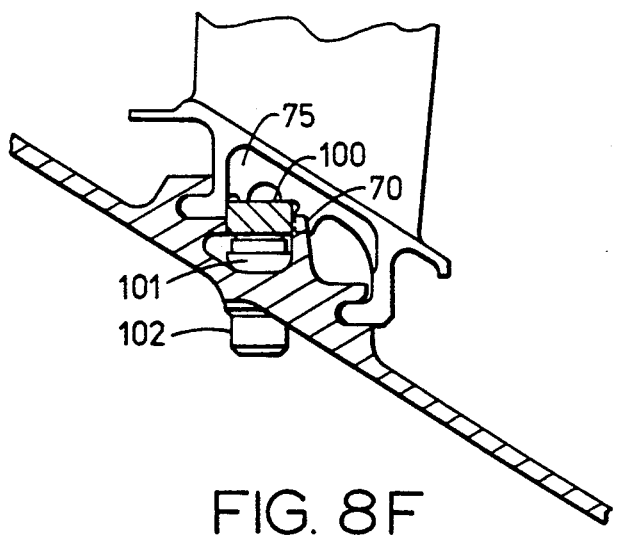
Figure 8H:
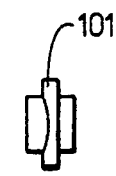
Figure 8I:
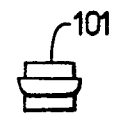
Figure 16:
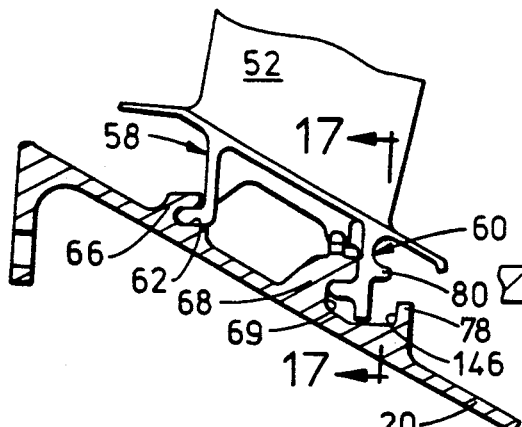
FIG. 16 is a view similar to that of FIG. 14, but showing another form of the attachment structure being useful for attaching a single final blade in circumferential row of blades.
Figure 17:
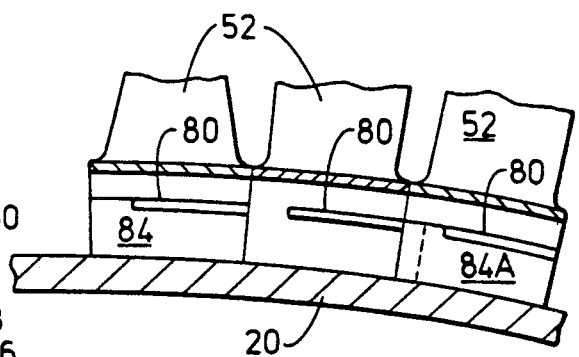
FIG. 17 is an elevational view, partly in section, of the attachment structure as seen along line 17—17 of FIG. 16.
Figure 18:
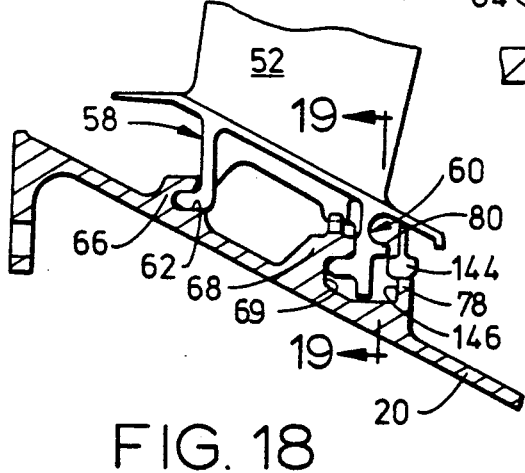
FIG. 18 is a view similar to that of FIG. 16, but showing the position of a lock member before insertion.
Figure 19:
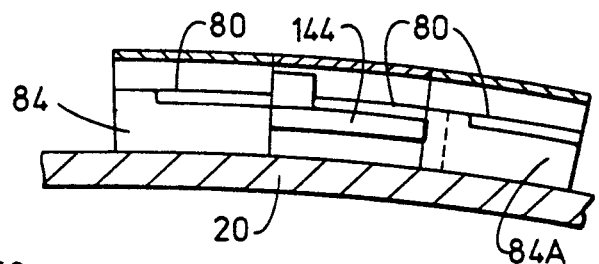
FIG. 19 is an elevational view, partly in section, of the attachment structure as seen along line 19—19 of FIG. 18.
Figure 20:
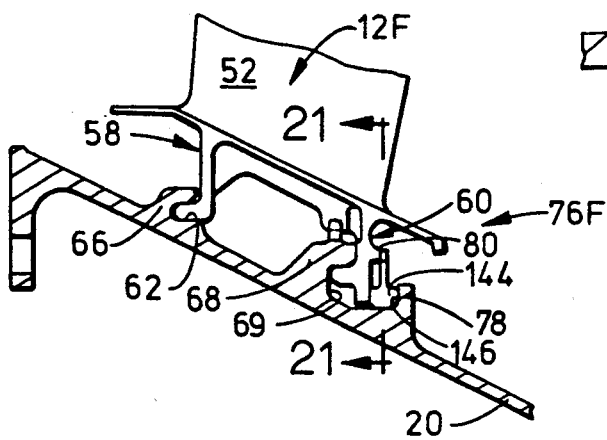
FIG. 20 is a view similar to that of FIG. 18, but showing the position of the lock member after insertion.
Figure 21:
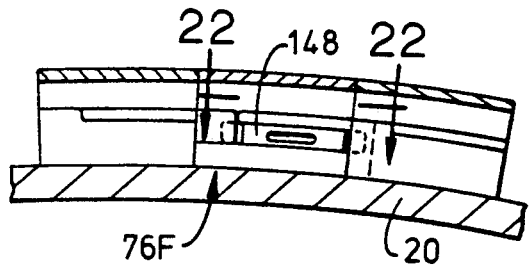
FIG. 21 is an elevational view, partly in section, of the attachment structure as seen along line 21—21 of FIG. 20.

Shown in FIG. 8E is a top view, FIG. 8H is a side view, and FIG. 8I is an end view of the self-wrenching, self-locking nut 101.

FIG. 8F is a typical full section through the rotor showing the final locking position of lock member 100.

Shown in FIG. 8G is a bottom view of the final lock member 100. A rectangular recess 100A and a round recess 100B are required in the lock member 100 at each nut location, so as to clear each nut when the lock member is in the inward position as shown in FIG. 8C.

As described above regarding lock member 96, any number of final blades 52 could be secured with a longer or shorter final lock member than the one shown in FIG. 8B.

In the alternative embodiments of FIGS. 9-10, 1-12, and 13-15, the locking arrangements 76C-76E of the attachment structures 12C-12E are adapted for locking all of the blades in the circumferential row. In FIGS. 9 and 10, the locking arrangement 76C of the attachment structure 12C includes a fastener pin 104 extending through an aperture 106 in the rotor 20 and into a pocket 108 in the inner end or base 52A of the blade 52. Wear resistant bushings 105, 107 are used on the surfaces with which the pin contacts. A retaining ring 110 that is installed into a groove 112 in the pin head retains the pin in the locking position by interfacing with slots 114 machined into the rotor 20. Another groove 116 near the end of the pin facilitates its removal. The arrangement 76C provides some particularly attractive features; specifically, all blades and locking members in a row are identical, and individual blades may be assembled or removed without disassembling the entire row. These features aid both assembly and maintenance of the gas turbine.

In FIGS. 11 and 12, the locking arrangement 76D of the attachment structure 12D includes a lock member 118 that spans one or more blades 52 and provides axial and pretwist restraint for the blades. After installation of all blades 52 and their lock members 118, a retention member 120 in the form of a ring radially captures the lock members. Tabs 122 in the retention ring 120 interface with slots 124 in each male member 60 to radially retain the forward end of the ring. The ring 120 has a hook 126 at the aft end of the ring which mates with a similar hook 128 on the rotor 20 for a rabbet fit to radially position and retain the ring. The ring 120 is retained axially by a wire 130 that is fed in through a slot 132 in the ring 120 and then into mating 360 degree grooves machined into the OD of the rotor 20 and ID of the ring 120. Each end of the wire 130 is bent at 130A to prevent its exit from the grooves.

In FIGS. 13-15, the locking arrangement 76E illustrates an attachment structure 12E adapted for attaching the last four blades installed in a circumferential row. The two end blades 52E in FIG. 13 utilize the locking arrangement 76 of FIGS. 3-5 using locking member 84. The four center blades 52C are the last four to be installed and are locked by a modified elongated lock member 134. The modified lock member 134 is inserted into a locking cavity 136, but from the aft side and not tangentially from an end of the locking cavity 136. The lock member 134 can be inserted from this direction due to the modified shape of its two tabs 138. The tabs 138 on the lock member 134 are recessed so that they are spaced from the heel side of the aft male members 60 when the lock member 134 is installed in the locking cavity 136. The spaces define retaining slots 140 therebetween. Two retainer members 142 of cross-sectional shapes sized to fit in the retaining slots 140 are inserted between the tabs 138 and the blade heels providing radial restraint for the lock member 134. By bending the bendable tabs 142A on the ends of the retainers 142, they are locked in place.

Figure 22:
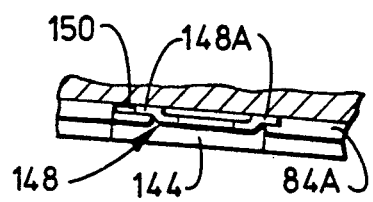
FIG. 22 is a fragmentary top plan view of a retainer member of the attachment structure as seen along line 22—22 of FIG. 21.
Figure 23:
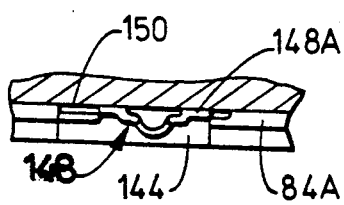
FIG. 23 is a view similar to that of FIG. 22, but showing the retainer member prior to being flattened for installing the retainer member into place.
Figure 24:
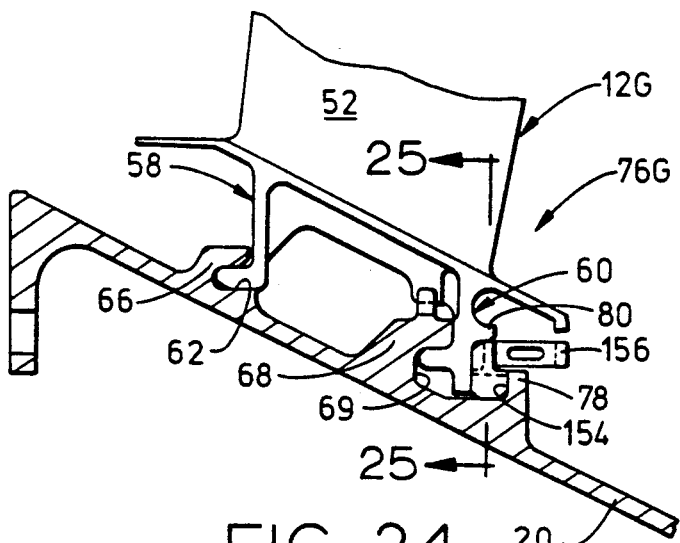
FIG. 24 is a view similar to that of FIG. 14, but showing a further form of the attachment structure being useful for attaching a single final blade in the circumferential row of blades.
Figure 25:
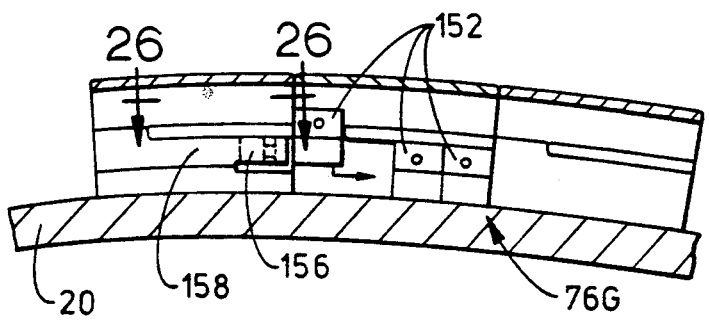
FIG. 25 is an elevational view, partly in section, of the attachment structure as seen along line 25—25 of FIG. 24 and having a retainer member in its prebent unlocking position.

In the three alternative embodiments of FIGS. 16-23, 24-28, and 29-32, the locking arrangements 76F-76H of the attachment structures 12F-12H are adapted for locking only a single last or final blade to complete the circumferential row of blades, as shown in FIGS. 3-5. In FIGS. 16-23, locking arrangement 76F of the attachment structure 12F includes a lock member 144 and locking cavity 146 substantially identical to that of FIG. 14. The lock member 144 is inserted into the locking cavity 146 from behind it, not from the side. However, the lock member 144 locks only a single blade. FIGS. 22 and 23 depict a retainer member 148 of the locking arrangement 76F respectively after and before being flattened from a prebent condition for installing the retainer member 148 into place. The prebent retainer member 148 is first installed in a lock slot 150; then when flattened, it extends in length and its end tabs 148A engage in slots in the lock members 144 and 84A on either side.

Figure 26:
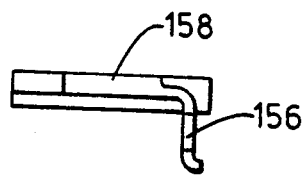
FIG. 26 is a fragmentary top plan view of the retainer member of the attachment structure as seen along line 26—26 of FIG. 25.
Figure 27:
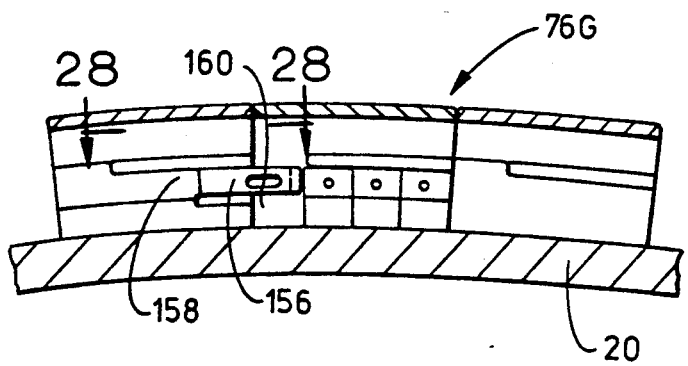
FIG. 27 is a view similar to that of FIG. 25, but showing the retainer member after bending to its locking position.
Figure 28:
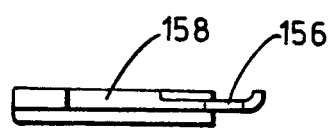
FIG. 28 is a fragmentary top plan view of the retainer member of the attachment structure as seen along line 28—28 of FIG. 27.

In FIGS. 24-28, the locking arrangement 76G of the attachment structure 12G includes a lock member in the form of a series of shorter lock segments 152 in the locking cavity 154 of the last blade installed. Once these segments 152 have been inserted, a retainer member 156 in the form of a bendable tab on the lock member 158 of the first blade installed is bent to fill the open slot 160. FIGS. 26 and 28 show the retainer member 156 respectively in prebent unlocking and bent locking positions.

Figure 29:
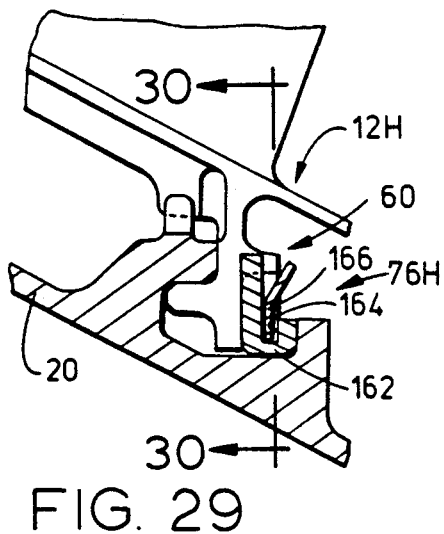
FIG. 29 is a view similar to that of FIG. 14, but showing a still further form of the attachment structure being useful for attaching a single final blade in the circumferential row of blades and having a retainer member in its prebent unlocking position.
Figure 30:
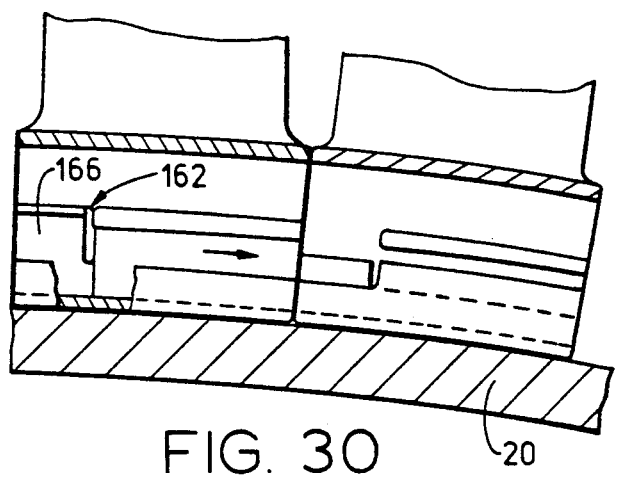
FIG. 30 is an elevational view, partly in section, of the attachment structure as seen along line 30—30 of FIG. 29.
Figure 31:
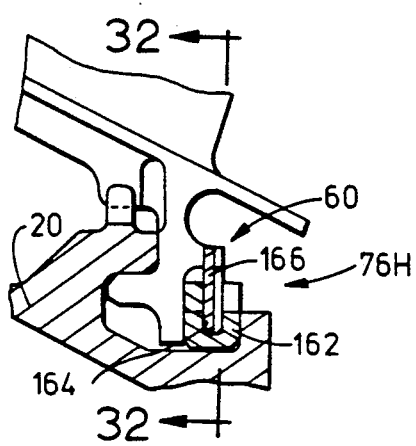
FIG. 31 is a view similar to that of FIG. 29, but showing the retainer member after bending to its locking position.
Figure 32:
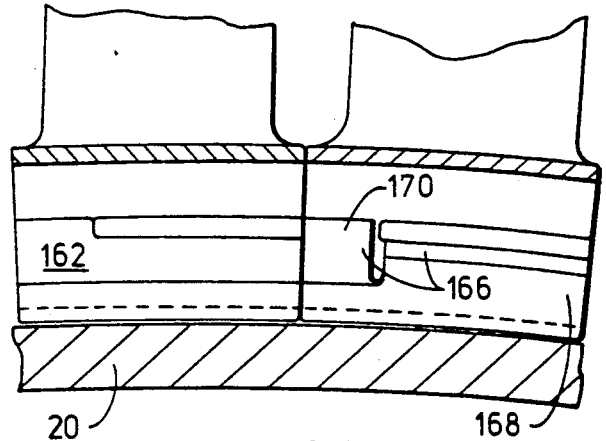
FIG. 32 is an elevational view, partly in section, of the attachment structure as seen along line 32—32 of FIG. 31.
Figure 34:
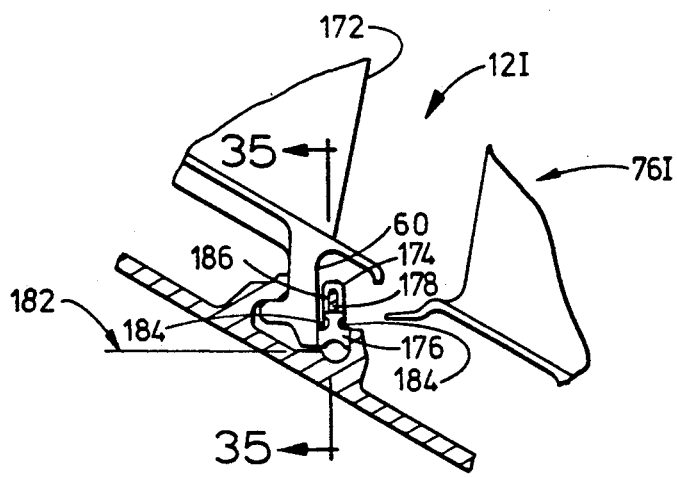
FIG. 34 is a view similar to that of FIG. 33, but showing the portion of the attachment structure being useful for attaching a single final blade in the circumferential row of blades.
Figure 33:
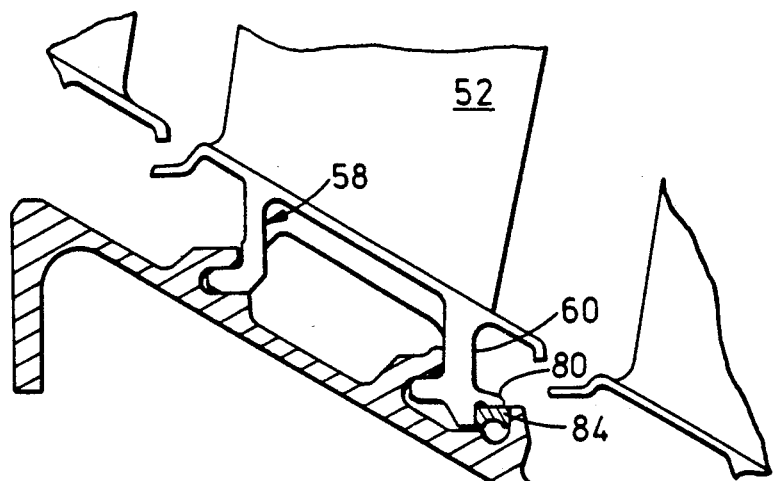
FIG. 33 is a view similar to that of FIG. 14, but showing a yet further form of the attachment structure being useful for attaching all but a final blade in the circumferential row.
Figure 35:
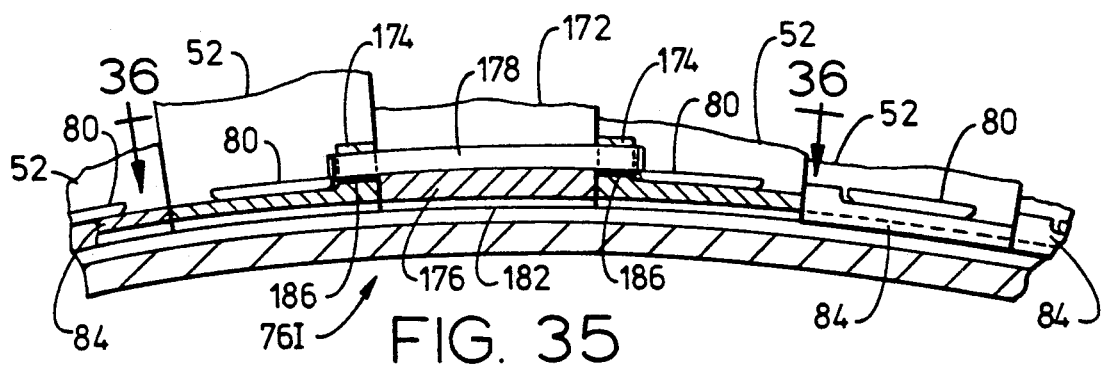
FIG. 35 is an elevational view, partly in section, of the attachment structure as seen along line 35—35 of FIG. 34.
Figure 36:
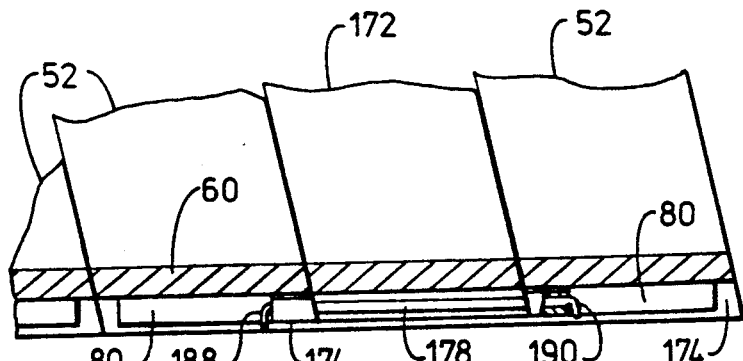
FIG. 36 is a fragmentary top plan view, partly broken away and sectioned, of the attachment structure as seen along line 36—36 of FIG. 35.
Figure 37:
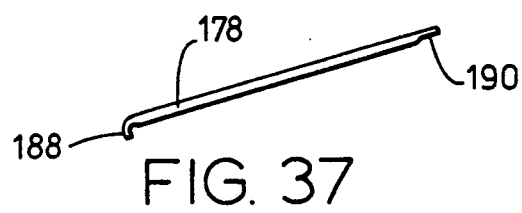
FIG. 37 is a top plan view of retainer member of the attachment structure before being installed as shown in FIGS. 35 and 36.

In FIGS. 29-32, the locking arrangement 76H of the attachment structure 12H includes a lock member 162 with a groove 164 to allow insertion of a sliding retainer member 166. The lock member 168 on the right blade is sized to allow insertion behind the blade after the blade is installed. With the bendable tab 170 on the retainer member 166 prebent down, as seen in FIG. 29, the retainer member can be slid over into the groove of the right lock member 168. After it is in place, the tab 170 is bent up to prevent tangential movement of the retainer member 166.

Finally, in the embodiment of FIGS. 33-37, the locking arrangement 76I of the attachment structure 12I exhibits the last blade 172 to be assembled, the second last blade lock 174, the last blade lock 176 and the last blade lock retainer 178. The assembly of all the other blades in the blade row follows the same procedure as described for the assembly of the blades 52 and lock members 84 shown in FIGS. 3-5. All blades 52 in the row are identical except the last blade 172. This blade 172 is made from a blade 52 by machining off the second flange (retainer member) 80 (see FIG. 33). After the assembly of all blades 52 and all blade locks 84 (the number of blade locks 84 is three fewer than the total number of blades in a row), the two blade locks 174 are installed, one to the right and one to the left of blade 172 to retain the adjacent blades 52. The last blade 172 can be installed either before or after installing the blade locks 174. After installing the two blade locks 174 and blade 172, the blade lock 176 for blade 172 is installed by merely positioning the blade lock 176 on the aft male member 60 and then pushing it radially inward until it seats on diameter 182. The outer portion of the blade lock 176 is "T-shaped" due to a puller groove 184 being provided for disassembly at both the forward and aft side of the blade lock. Thus, the blade lock 176 is symmetrical which permits it to be installed either way, thereby producing a foolproof assembly. A blade lock retainer 178 is provided to prevent the last blade lock 176 from escaping outwardly. The two blade locks 174 which are used to retain the two blades 52 adjacent to blade 172 are equipped with a racetrack-shaped hole 186. The blade lock retainer 178 is slid through the racetrack hole 186 in the left blade lock 174, then across the blade lock 176 and then into the racetrack hole 186 in the right blade lock 174 until the prebent end 188 of the blade lock retainer is seated against the left blade lock 174, then the straight end 190 of the blade lock retainer is bent 90 degrees to complete the assembly.

The major advantages of each of the embodiments of the attachment structure of the present invention is the performance of all the blade attachment functions with a relatively compact and lightweight set of hardware, and the ability to maintain blade interlock pretwist and to provide a means of damping airfoil vibratory modes. At the same time, the attachment structure accurately positions and reliably connects the blades 52 to the inner rotor 20. In each of the alternative locking arrangements for retaining the last of the blades 52, all bending and installation procedures can be performed from the axial direction. This feature optimizes the assembly procedure where overhanging angel wings of the blades minimize the space available.

The present invention and many of its attendant advantages will be understood from the foregoing description, and it will be apparent that various changes may be made in the form, construction and arrangement of the parts thereof without departing from the spirit and scope of the invention or sacrificing its material advantages, the forms hereinbefore described being merely preferred or exemplary embodiments thereof.

We claim:

1. An attachment structure for attaching a turbine blade to a rotor of a gas turbine engine, said attachment structure comprising:
   (a) first and second male members spaced axially along and extending circumferentially about each respective rotor blade, each male member having a first portion attached to a turbine blade platform and extending therefrom in a radial direction and a second portion attached to said first portion and extending therefrom in an axial direction such that said first and second portions define a hook-like configuration on each male member;
   (b) means attached to a rotor spool defining first and second grooves spaced axially along and extending circumferentially about the rotor spool and opening in a common axial direction for receiving in mated relation respectively and concurrently said second portions of said hook-like configured first and second male members; and
   (c) means for removably locking said second portions of said male members in mated relation with said grooves to thereby restrain the turbine blade against radial and axial movements relative to the rotor spool.

2. The attachment structure as recited in claim 1, wherein said locking means includes:
   a first projection attached to the rotor spool spaced axially from an aft one of said first and second male members and an aft one of said first and second grooves, said first projection extending circumferentially about and radially from the rotor spool;
   a second projection attached to a heel side of said aft one of said male members at a location thereon spaced outwardly from said second portion thereof, said first and second projections together with said aft male member and the rotor spool defining a locking cavity; and
   an elongated lock member of a cross-sectional shape sized to fit within said lock cavity and in locking engagement with said first and second projections, said aft male member and the rotor spool to thereby restrain the turbine blade against radial and axial movements relative to the rotor spool.

3. The attachment structure as recited in claim 2, wherein said lock cavity is open at its opposite ends and thereby adapted to slidably receive said lock member therein through one of said open ends of said lock cavity.

4. The attachment structure as recited in claim 3, wherein said aft male member and said lock member have stop elements defined thereon which interengage when said lock member is fully installed in said lock cavity.

5. The attachment structure as recited in claim 2, wherein said second projection extends partially across said heel side of said aft male member terminating short of one lateral edge thereof so as to define a lock slot coextensive with a remainder of said heel side of said aft male member.

6. The attachment structure as recited in claim 5, wherein said lock member has a tab projecting radially from one end portion thereof and of a cross-sectional shape sized to fit within said lock slot on said remainder of said heel side of said aft male member and in meshing engagement with said second projection when said lock member is installed in said lock cavity.

7. The attachment structure as recited in claim 6, wherein said lock cavity is open at its opposite ends and thereby adapted to slidably receive said lock member therein through one of said open ends, said tab on said lock member fitting into said lock slot and engaging an end of said second projection when said lock member is fully installed in said lock cavity.

8. The attachment structure as recited in claim 6, wherein said tab of said lock member is spaced from said heel side of said aft male member when said lock member is installed in said lock cavity so as to define a retaining slot therebetween.

9. The attachment structure as recited in claim 8, wherein said locking means also includes a retainer member of a cross-sectional shape sized to fit within said retaining slot between said lock member and said heel side of said aft male member retaining said lock member in said lock cavity.

10. The attachment structure as recited in claim 9, wherein said retainer member comprises:
    a member having a first nonretaining configuration allowing its installation in said retaining slot; and
    a second retaining configuration for preventing its removal from said retaining slot.

11. The attachment structure as recited in claim 10, wherein said retainer member is in the form of an elongated rod having at least one bendable tab thereon.

12. The attachment structure as recited in claim 10, wherein:
    said nonretaining configuration of said retainer member comprises a prebent configuration of said retainer member; and
    said retaining configuration of said retainer member comprises a flattened configuration of said retainer member.

13. The attachment structure as recited in claim 1, wherein said locking means includes:
  means defining an aperture through said rotor spool in alignment with a blade platform located between said male members thereof; and
  means extending through said aperture and being adjustable for engaging the blade platform and forcing it in a radial direction away from the rotor spool for locking and retaining said male members in mated relation in said grooves.

14. The attachment structure as recited in claim 13, wherein said adjustable means includes a fastener member.

15. The attachment structure as recited in claim 14, wherein said adjustable means also includes a lock member located between the blade platform and an end of said fastener member.

16. The attachment structure as recited in claim 1, further comprising:
  a first plurality of elements attached to and extending in circumferentially spaced relation along the rotor spool; and
  a second plurality of elements attached to and extending in circumferentially spaced relation along the turbine blade platform;
  said first and second pluralities of elements disposed in interfitting relation so as to restrain movement of the turbine blade in circumferential relation to the rotor spool.

17. The attachment structure as recited in claim 16, wherein one of said first and second pluralities of elements is a row of projecting tabs and the other is a row of slots which receive the tabs.

18. An attachment structure for attaching all but at least a final one of a plurality of turbine blades in a circumferential row thereof to a rotor of a gas turbine engine, said attachment structure comprising:
  (a) forward and aft male members spaced axially along and extending circumferentially about each respective rotor blade, each male member having a first portion attached to a turbine blade platform and extending therefrom in a radial direction and a second portion attached to said first portion and extending therefrom in an axial direction such that said first and second portions define a hook-like configuration on each male member;
  (b) means attached to a rotor spool defining forward and aft grooves spaced axially along and extending circumferentially about the rotor spool for receiving in mated relation said second portions of said hook-like configured forward and aft male members; and
  (c) means for locking said second portions of said male members in mated relation with said grooves to thereby restrain the turbine blade against radial and axial movements relative to the rotor spool, said locking means including
    i. a first flange attached to the rotor spool spaced axially from said aft male member and said aft groove and extending circumferentially about and radially from the rotor spool,
    ii. a second flange attached to a heel side of said aft male member at a location thereon spaced outwardly from said second portion thereof, said first and second flanges together with said aft male member and the rotor spool, defining a locking cavity, and
    iii. an elongated lock member of a cross-sectional shape sized to fit within said lock cavity and in locking engagement with said first and second flanges, said aft male member and the rotor spool to thereby restrain the turbine blade against radial and axial movements relative to the rotor spool, and
    iv. said lock cavity being open at its opposite ends and thereby adapted to slidably receive said lock member therein through one of said open ends of said lock cavity from a location adjacent to a side of the blade at which a next one of said blades will be installed.

19. The attachment structure as recited in claim 18, wherein said aft male member and said lock member have stop elements defined thereon which interengage when said lock member is fully installed in said lock cavity.

20. The attachment structure as recited in claim 18, wherein said second flange extends partially across said heel side of said aft male member terminating short of one lateral edge thereof so as to define a lock slot coextensive with a remainder of said heel side of said aft male member.

21. The attachment structure as recited in claim 20, wherein said lock member has a tab projecting radially from one end portion thereof and of a cross-sectional shape sized to fit within said lock slot on said remainder of said heel side of said aft male member and in meshing engagement with said second flange when said lock member is installed in said lock cavity.

22. An attachment structure for attaching turbine blades in a circumferential row to a rotor of a gas turbine engine, said attachment structure comprising:
  (a) first and second male members spaced axially along and extending circumferentially about each respective rotor blade, each male member having a first portion attached to an end of a turbine blade and extending therefrom in a radial direction and a second portion attached to said first portion and extending therefrom in an axial direction such that said first and second portions define each male member with a hook-like configuration;
  (b) means attached to a rotor spool defining first and second grooves spaced axially along and extending circumferentially about the rotor spool for receiving in mated relation respectively and concurrently said second portions of said hook-like configured first and second male members;
  (c) first means for locking said second portions of said male members in mated relation with said grooves to thereby restrain all but at least a final one of the turbine blades in the circumferential row thereof against radial and axial movements relative to the rotor spool; and
  (d) second portions of said male members in mated relation with said grooves to thereby restrain the final blade in the circumferential row thereof against radial and axial movements relative to the rotor spool.

23. The attachment structure as recited in claim 22, wherein said first locking means include:
  a first flange attached to the rotor spool spaced axially from said second male member of each of the blades of said row of blades but at least a final one and said second groove and extending circumferentially about and radially from the rotor spool;

a second flange attached to a heel side of said second male member of each of the blades but at least a final one and a location thereon spaced outwardly from said second portion thereof, said first and second flanges together with said second male member and the rotor spool defining a locking cavity; and an elongated lock member of a cross-sectional shape sized to fit within said lock cavity and in locking engagement with said first and second flanges, said second male member and the rotor spool to thereby restrain the turbine blade against radial and axial movements relative to the rotor spool;

said lock cavity being open at its opposite ends and thereby adapted to slidably receive said lock member therein through one of said open ends of said lock cavity from a location adjacent to a side of the blade at which a next one of said blades will be installed.

24. The attachment structure as recited in claim 23, wherein said second flange extends partially across said heel side of said second male member terminating short of one lateral edge thereof so as to define a lock slot coextensive with a remainder of said heel side of said second male member.

25. The attachment structure as recited in claim 24, wherein said lock member has a tab projecting radially from one end portion thereof and of a cross-sectional shape sized to fit within said lock slot on said remainder of said heel side of said second male member and in meshing engagement with said second flange when said lock member is installed in said lock cavity.

26. The attachment structure as recited in claim 22, wherein said second locking means include:

a first projection attached to the rotor spool spaced axially from an aft one of said first and second male members of at least the final blade and an aft one of said first and second grooves, said first projection extending circumferentially about and radially from the rotor spool;

a second projection attached to a heel side of said aft one of said male members of at least the final blade and a location thereon spaced outwardly from said second portion thereof, said first and second projections together with said aft male member and the rotor spool defining a locking cavity; and an elongated lock member of a cross-sectional shape sized to fit within said locking cavity and for locking engagement with said first and second projections, said aft male member and the rotor spool to thereby restrain the turbine blade against radial and axial movements relative to the rotor spool;

said second projection extending partially across said heel side of said aft male member terminating short of one lateral edge thereof so as to define a lock slot coextensive with a remainder of said heel side of said aft male member;

said lock member having a tab projecting radially from one end portion thereof and of a cross-sectional shape sized to fit within said lock slot on said remainder of said heel side of said aft male member and in meshing engagement with said second projection when said lock member is installed in said locking cavity;

said tab of said lock member being spaced from said heel side of said aft male member when said lock member is installed in said locking cavity so as to define a retaining slot therebetween; and a retainer member of cross-sectional shape sized to fit within said retaining slot between said lock member and said heel side of said aft male member retaining said lock member in said locking cavity.

27. The attachment structure as recited in claim 26, wherein said retainer member comprises:

a member having a first nonretaining configuration allowing its installation in said retaining slot; and a second retaining configuration for preventing its removal from said retaining slot.

28. The attachment structure as recited in claim 22, wherein said second locking means include:

a first projection attached to the rotor spool spaced axially from an aft one of said first and second male members of at least a first blade and the final blade and an aft one of said first and second grooves, said first projection extending circumferentially about and radially from the rotor spool;

a second projection attached to a heel side of said aft one of said male members of at least the first blade and the final blade and at a location thereon spaced outwardly from said second portion thereof, each respective second projection extending partially across said heel side of each respective one of said aft male members terminating short of one lateral edge thereof so as to define a lock slot coextensive with a remainder of said heel side of said aft male member of each of said first and last blades, said first and said respective second projections together with said respective aft male members and the rotor spool defining a locking cavity; and an elongated lock member of a cross-sectional shape sized to fit within said locking cavity and in locking engagement with said first projection, said second projection, and said aft male member of said first turbine blade, and the rotor spool to thereby restrain the first turbine blade of said row of blades against radial and axial movements relative to the rotor spool and having a tab projecting radially form one end portion thereof and of a cross-sectional shape sized to fit within said lock slot on said remainder of said heel side of said aft male member of said first turbine blade and in meshing engagement with said second projection of said first turbine blade when said lock member is installed in said lock cavity and including a retainer member in the form of a bendable tab attached to said lock member; and a second lock member of said first turbine blade comprising a plurality of lock segments of cross-sectional shape sized to fit within said locking cavity and for locking engagement with said first projection, said second projection, and said aft male member of said final turbine blade, and the rotor spool to thereby restrain said last turbine blade of said row of blades disposed circumferentially adjacent said first turbine blade against radial and axial movements relative to the rotor spool when said tab is in a locking position.

* * * * *